(12) United States Patent
Rathore et al.

(10) Patent No.: US 12,507,085 B2
(45) Date of Patent: Dec. 23, 2025

(54) PRIORITIZATION OF DISORIENTED CELLS IN WIRELESS NETWORK

(71) Applicant: Rakuten Symphony, Inc., Tokyo (JP)

(72) Inventors: Durgesh Rathore, Indore (IN); Atul Rajpoot, Indore (IN); Sudeep Kumar Jain, Indore (IN); Nilesh Bankar, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 395 days.

(21) Appl. No.: 18/021,433

(22) PCT Filed: Dec. 28, 2022

(86) PCT No.: PCT/US2022/054110
§ 371 (c)(1),
(2) Date: Feb. 15, 2023

(87) PCT Pub. No.: WO2024/107214
PCT Pub. Date: May 23, 2024

(65) Prior Publication Data
US 2024/0314583 A1 Sep. 19, 2024

(30) Foreign Application Priority Data
Nov. 15, 2022 (IN) .............................. 202221065446

(51) Int. Cl.
*H04W 24/02* (2009.01)
*H04W 16/28* (2009.01)

(52) U.S. Cl.
CPC .......... *H04W 24/02* (2013.01); *H04W 16/28* (2013.01)

(58) Field of Classification Search
CPC .............................. H04W 24/02; H04W 16/28
See application file for complete search history.

(56) References Cited

U.S. PATENT DOCUMENTS

2020/0275334 A1* 8/2020 Visuri .................... H04W 36/22
2022/0329524 A1* 10/2022 Sinha .................. H04L 41/0896
(Continued)

OTHER PUBLICATIONS

International Search Report dated May 10, 2023 in Application No. PCT/US22/54110.
(Continued)

*Primary Examiner* — Kenneth T Lam
(74) *Attorney, Agent, or Firm* — Sughrue Mion, PLLC (57) ABSTRACT

Embodiments herein provide a method for prioritizing disoriented cells in a wireless network by an electronic device. The method includes determining a morphology factor of each disoriented cell of a plurality of disoriented cells. Further, the method includes determining a cell type of each disoriented cell of the plurality of disoriented cells based on the morphology factor of each disoriented cell of the plurality of disoriented cells. Further, the method includes determining a PRB utilization of each disoriented cell of the plurality of disoriented cells. Further, the method includes determining a number of RRC connected users of each disoriented cell of the plurality of disoriented cells. Further, the method includes determining a priority for each disoriented cell of the plurality of disoriented cells based on the morphology factor, the cell type, the PRB utilization, and the RRC connected users.

10 Claims, 10 Drawing Sheets

(56) References Cited

U.S. PATENT DOCUMENTS

2024/0155383 A1* 5/2024 Massaro ............... H04W 24/02
2024/0259836 A1* 8/2024 Shete ..................... H04L 41/16
2024/0380673 A1* 11/2024 Yanggratoke .......... H04L 41/16
2025/0081087 A1* 3/2025 Rathore ................ H04W 48/16

OTHER PUBLICATIONS

Written Opinion of the International Searching Authority dated May 10, 2023 in Application No. PCT/US22/54110.

* cited by examiner

PRIORITIZATION OF DISORIENTED CELLS IN WIRELESS NETWORK

CROSS REFERENCE TO RELATED APPLICATIONS

This application is a National Stage of International Application No. PCT/US2022/054110 filed Dec. 28, 2022, claiming priority based on Indian patent application Ser. No. 20/2221065446 filed Nov. 15, 2022.

FIELD OF INVENTION

The present disclosure relates to a wireless network, and more particularly to a method and an electronic device for prioritizing disoriented cells in the wireless network.

BACKGROUND

In general, a role of antenna parameters like Azimuth plays an important role in a wireless network as the antenna parameters decide the footprint of a radio frequency (RF) coverage. It is important that the antennas should be installed on its planned values to provide the enough coverage. Changes in the antenna parameters are quite often in the wireless network because of various activities such as RF optimization, network upgradation, resolution of customer. In order, to ensure a correct database as per actual value in a coverage field, network operators need to initiate field visit on a regular basis and correct all such mismatches. This is a big task, which impacts operating cost and requires huge manpower.

There are some systems or methods available in market to check the antenna alignment, but the systems or methods require field visit and manpower on a regular basis to have a periodic measurement which is also a time-consuming process and becomes a bottleneck for the activities related to RF optimization. In an example, Antenna azimuth system (AAS)—This increase the cost as the operator need to add an extra device on the antenna. Further, the antenna alignment leads disoriented cells (e.g., network coverage loopholes or network gaps) in the wireless network Hence, there is a need to a method and an electronic device to prioritize disoriented cells (e.g., network coverage loopholes or network gaps) so that a user (e.g., radio frequency (RF) engineer or operator) gets to know the exact severity of the disoriented cells to optimize the disoriented cells for providing better service to a customer, also avoid the coverage gaps or the service gaps in the wireless network, but existing methods and systems do not have any prior techniques or methods to prioritize the disoriented cells. Thus, results in reducing/degrading a user service experience.

Thus, it is desired to address the above-mentioned disadvantages or other shortcomings or at least provide a useful alternative.

OBJECT OF INVENTION

The principal object of the embodiments herein is to provide a method and an electronic device for prioritizing disoriented cells in a wireless network. The proposed method can be used to prioritize the disoriented cells (e.g., network coverage loopholes or network gaps) so that a user (e.g., radio frequency (RF) engineer or operator) of the electronic device gets to know the exact severity of the disoriented cells to optimize the disoriented cells for providing better service to the customer. The method can be used to assist the user to decide which disoriented cells should be mitigate first based on the identified priority in order to improve the network performance in an important geographical area. The method can be used to avoid coverage gaps or service gaps in the wireless network.

SUMMARY

Accordingly, the embodiment herein discloses a method for prioritizing disoriented cells in a wireless network. The method includes receiving, by an electronic device in the wireless network, information about a plurality of disoriented cells. Further, the method includes determining, by the electronic device, a morphology factor of each disoriented cell of the plurality of disoriented cells. Further, the method includes determining, by the electronic device, a cell type of each disoriented cell of the plurality of disoriented cells based on the morphology factor of each disoriented cell of the plurality of disoriented cells. Further, the method includes determining, by the electronic device, a Physical Resource Block (PRB) utilization of each disoriented cell of the plurality of disoriented cells. Further, the method includes determining, by the electronic device, a number of Radio Resource Control (RRC) connected users of each disoriented cell of the plurality of disoriented cells. Further, the method includes determining, by the electronic device, a priority for each disoriented cell of the plurality of disoriented cells based on the morphology factor, the cell type, the PRB utilization, and the RRC connected users. Further, the method includes prioritizing, by the electronic device, the plurality of disoriented cells for optimization based on the priority for each disoriented cell of the plurality of disoriented cells.

Accordingly, the embodiment herein discloses an electronic device for prioritizing disoriented cells in a wireless network. The electronic device includes a processor communicatively coupled to a memory. The processor receives information about a plurality of disoriented cells. Further, the processor determines a morphology factor of each disoriented cell of the plurality of disoriented cells. Further, the processor determines a cell type of each disoriented cell of the plurality of disoriented cells based on the morphology factor of each disoriented cell of the plurality of disoriented cells. Further, the processor determines a PRB utilization of each disoriented cell of the plurality of disoriented cells. Further, the processor determines a number of RRC connected users of each disoriented cell of the plurality of disoriented cells. Further, the processor determines a priority for each disoriented cell of the plurality of disoriented cells based on the morphology factor, the cell type, the PRB utilization, and the RRC connected users. Further, the processor prioritizes the plurality of disoriented cells for optimization based on the priority for each disoriented cell of the plurality of disoriented cells.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

BRIEF DESCRIPTION OF FIGURES

The method and the electronic device are illustrated in the accompanying drawings, throughout which like reference letters indicate corresponding parts in the various figures. The embodiments herein will be better understood from the following description with reference to the drawings, in which.

DETAILED DESCRIPTION OF INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, the embodiment herein is to provide a method for prioritizing disoriented cells in a wireless network. The method includes receiving, by an electronic device in the wireless network, information about a plurality of disoriented cells. Further, the method includes determining, by the electronic device, a morphology factor of each disoriented cell of the plurality of disoriented cells. Further, the method includes determining, by the electronic device, a cell type of each disoriented cell of the plurality of disoriented cells based on the morphology factor of each disoriented cell of the plurality of disoriented cells. Further, the method includes determining, by the electronic device, a PRB utilization of each disoriented cell of the plurality of disoriented cells. Further, the method includes determining, by the electronic device, a number of RRC connected users of each disoriented cell of the plurality of disoriented cells. Further, the method includes determining, by the electronic device, a priority for each disoriented cell of the plurality of disoriented cells based on the morphology factor, the cell type, the PRB utilization, and the RRC connected users. Further, the method includes prioritizing, by the electronic device, the plurality of disoriented cells for optimization based on the priority for each disoriented cell of the plurality of disoriented cells.

Unlike conventional methods and systems, the proposed method can be used to prioritize the disoriented cells (e.g., network coverage loopholes or network gaps) so that a user (e.g., radio frequency (RF) engineer or operator) of the electronic device gets to know the exact severity of the disoriented cells to optimize the disoriented cells for providing better service to the customer.

The method can be used to assist the user to decide which disoriented cells should be mitigate first based on the identified priority in order to improve the network performance in an important geographical area. The method can be used to avoid coverage gaps or service gaps in the wireless network.

The method can be implemented on a respective band & L4 geography (in other words, the method is implemented on a respective band and postal code).

Referring now to the drawings and more particularly to FIGS. 1 through 9, where similar reference characters denote corresponding features consistently throughout the figures, there are shown preferred embodiments.

Figure 1:
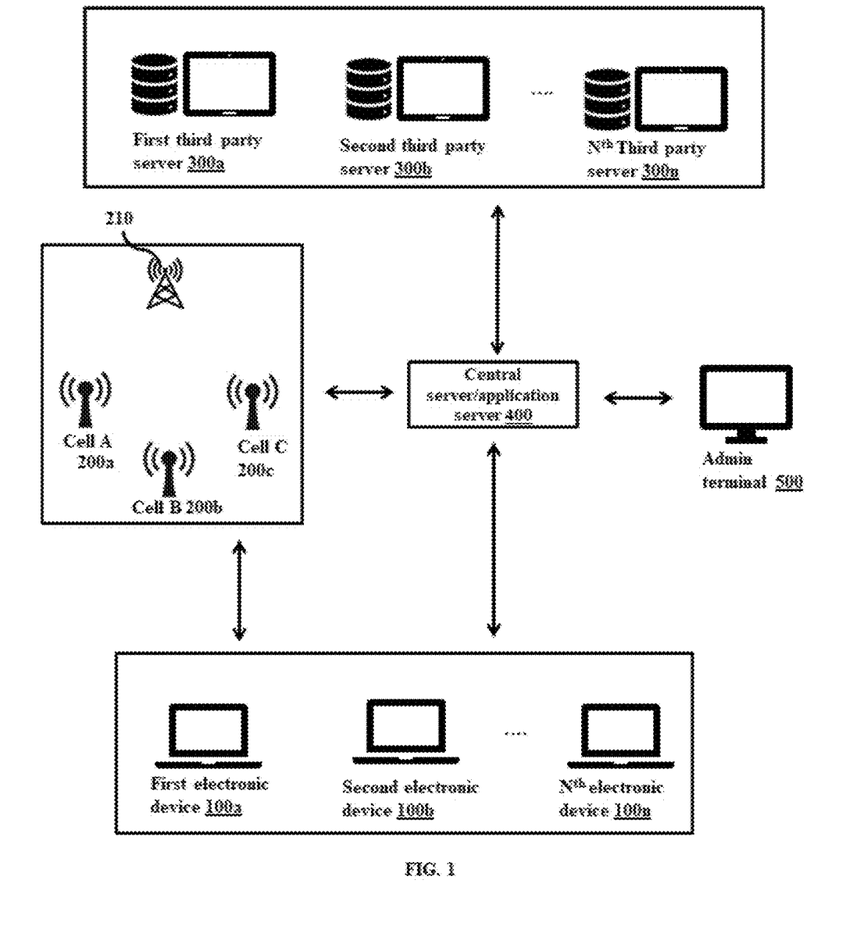
FIG. 1 is an example overview of a wireless network for prioritizing disoriented cells, according to the embodiments as disclosed herein.

FIG. 1 is an example overview of a wireless network (1000) for prioritizing disoriented cells (or misaligned cells), according to the embodiments as disclosed herein. The wireless network (1000) can be, for example, but not limited to, a fourth generation (4G) network, a fifth generation (5G) network, a sixth generation (6G) network, an open radio access network (ORAN) network or the like. In an embodiment, the wireless network (1000) includes a plurality of electronic device (100*a*-100*n*), a plurality of cells (200*a*-200*c*), a base station (210), a plurality of third party servers (300*a*-300*c*), a central server/application server (400), and an admin terminal (500) (e.g., computer, laptop or the like). The central server/application server (400), the admin terminal (500) and the plurality of third party servers (600*a*-600*c*) monitor and store information about the disoriented cell. In the wireless network (1000), base stations (or network elements) (210) are providing a service in the cells (200*a*-200*c*), respectively. The base station (210) provides the service to the electronic devices (100*a*-100*c*) in the cell (200*a*), similarly, the base station (210) provides the service to another electronic devices in the cell (200*b*). The service can be, for example, but not limited to a call service, a voice communication service, a messaging service, a video streaming service, Internet of Things (IoT) services or the like. Hereafter, the label of the electronic device is 100 and the cell is 200.

In general, the disoriented cells estimate azimuth based on UE data, which are collected through passive monitoring. Further the disoriented cells generates periodically with the remedy information, which helps a RF optimization team to optimize the wireless network. In order to generate the remedy information of the disoriented Cells, following are the inputs required.

1. Site Database: Site database for all the sites in the wireless network, including information of Latitude, Longitude, Azimuth, band details, on-air status, on-air date, eNB ID, ECGI Antenna height, Electrical tilt, Mechanical tilt, etc.
    a. Boundaries: Multiple Geographical boundaries are required
    b. Geo-located Data: Collected using drive test tools, as well as passively collected data has been used for the last 7 days (for example).
    c. New sites on air database in the network for the last 7 days (for example).

All the parameters are configurable and can be set according to a vendor or the service provider.

The electronic device (100) can be, for example, but not limited to a computer system, a host server, a personal computer, a smart phone, a Personal Digital Assistant (PDA), a tablet computer, a laptop computer, an Internet of Things (IoT), embedded systems, edge devices, a vehicle to everything (V2X) device or the like.

The electronic device (100) receives information about a plurality of disoriented cells (200*a*-200*c*). The information can be, for example, but not limited to radio frequency (RF) planning, changing design dynamics, cell capacity, cell edge changes over time, performance optimization, physical obstruction information, antenna azimuth or the like. Further, the electronic device (100) determines a morphology factor of each disoriented cell of the plurality of disoriented cells (200*a*-200*c*). The morphology factor corresponds to a urban, a rural, and a sub-urban. In an example, the electronic device (100) determines the morphology factor of each disoriented cell of the plurality of disoriented cells (200*a*-200*c*) using table 1.

TABLE 1

| Morphology factor | Value |
|---|---|
| Urban | 2 |
| Rural | 1 |

TABLE 1-continued

| Morphology factor | Value |
|---|---|
| Suburban | 1 |
| Other | 0 |

Further, the electronic device (100) determines a cell type (e.g., cyclic swap, sector swap, diversity swapping, or the like) of each disoriented cell of the plurality of disoriented cells (200*a*-200*c*) based on the morphology factor of each disoriented cell of the plurality of disoriented cells (200*a*-200*c*). The sector-swap means that a sector of a site is serving the area in a direction different to its azimuth. If Measurement of $1^{st}$ sector falling to $2^{nd}$ one, measurement of $2^{nd}$ sector is falling to third sector & measurement of third sector is falling to first sector then it is the cyclic swap.

In an example, the electronic device (100) determines the cell type of each disoriented cell of the plurality of disoriented cells (200*a*-200*c*) based on the morphology factor of each disoriented cell of the plurality of disoriented cells (200*a*-200*c*) using table 2.

TABLE 2

| Cell type | Value |
|---|---|
| Cyclic Swap | 3 |
| Sector Swap | 2 |
| Others | 1 |

Further, the electronic device (100) determines a Physical Resource Block (PRB) utilization of each disoriented cell of the plurality of disoriented cells (200*a*-200*c*). In an embodiment, the electronic device (100) determines an average PRB utilization on hourly basis and a maximum average PRB utilization on hourly basis. Based on the average PRB utilization on the hourly basis and the maximum average PRB utilization on the hourly basis, the electronic device (100) determines the PRB utilization of each disoriented cell of disoriented cells (200*a*-200*c*). In an embodiment, the average PRB utilization and the maximum average PRB utilization are determined based on various time interval. The time interval could be per day basic, per week basic, or per month basic. In an example, the electronic device (100) determines the PRB utilization of each disoriented cell of the plurality of disoriented cells (200*a*-200*c*) using below equation (1).

$$PRB \text{ Utilization} = (AVG \text{ } DL \text{ } PRB \text{ Utilization Hourly}/ \text{Max.} (AVG \text{ } DL \text{ } PRB \text{ Utilization Hourly}) \quad (1)$$

Further, the electronic device (100) determines a number of Radio Resource Control (RRC) connected users of each disoriented cell of the plurality of disoriented cells (200*a*-200*c*). In an embodiment, the electronic device (100) determines an average RRC connected users on hourly basis and a maximum RRC connected users on hourly basis. Based on the average RRC connected users on hourly basis and the maximum RRC connected users on hourly basis, the electronic device (100) determines the number of RRC connected users of each disoriented cell of disoriented cells (200a-200c). In an example, the electronic device (100) determines the number of RRC connected users of each disoriented cell of the plurality of disoriented cells (200a-200c) using the equation (2).

$$RRC\ Factor = AVG\ RRC\ Connected\ User\_hourly/Max\ (AVG\ RRC\ Connected\ User\_Hourly)\ under\ all\ L4\ Geography \quad (2)$$

Further, the electronic device (100) determines a priority for each disoriented cell of the plurality of disoriented cells (200a-200c) based on the morphology factor, the cell type, the PRB utilization, and the RRC connected users. In an embodiment, the electronic device (100) retrieves a weightage for the cell type for each disoriented cell of the plurality of disoriented cells (200a-200c) and retrieves a weightage for the morphology factor for each disoriented cell of the plurality of disoriented cells (200a-200c). For each disoriented cell of the plurality of disoriented cells (200a-200c), the electronic device (100) determines the priority by combining the weightage for the cell type, the weightage for the morphology factor, the PRB utilization, and the number of RRC connected users.

Further, the electronic device (100) prioritizes the plurality of disoriented cells (200a-200c) for optimization based on the priority for each disoriented cell of the plurality of disoriented cells (200a-200c). In an embodiment, the electronic device (100) sorts the priority of the plurality of disoriented cells (200a-200c) in a descending order or an ascending order. Further, the electronic device (100) ranks the plurality of disoriented cells (200a-200c) based on the sorted priority of the plurality of disoriented cells (200a-200c). In an example, first priority may be ranking better or equal to $75^{th}$ percentile, a second priority may be ranking in range of $74^{th}$ percentile to 50 percentile, and a third priority may be below 50 percentile.

The electronic device (100) prioritizes the disoriented cells (e.g., network coverage loopholes, service gaps or network gaps) so that a user (e.g., radio frequency (RF) engineer or operator) of the electronic device (100) gets to know the exact severity of the disoriented cells to optimize the disoriented cells for providing better service to the customer.

The electronic device (100) can be used to assist the user to decide which disoriented cells should be mitigate first based on the identified priority in order to improve the network performance in an important geographical area. The electronic device (100) can be used to avoid coverage gaps or service gaps in the wireless network.

Figure 2:
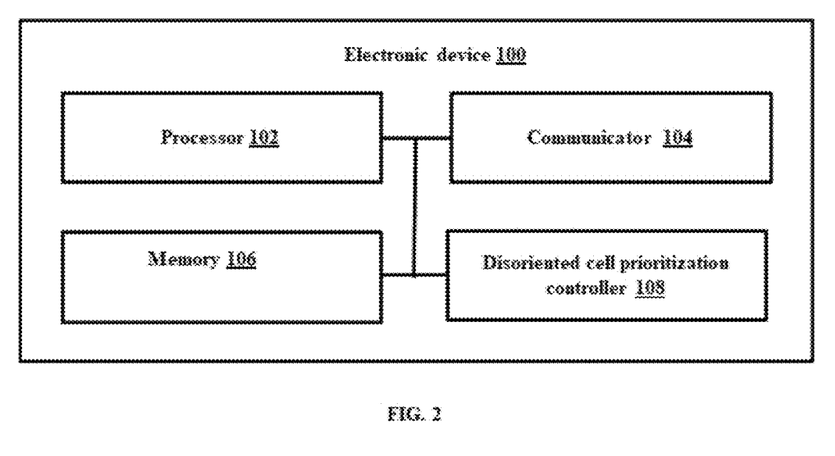
FIG. 2 shows various hardware components of an electronic device for prioritizing disoriented cells in the wireless network, according to the embodiments as disclosed herein.

FIG. 2 shows various hardware components of the electronic device (100) for prioritizing the disoriented cells (200a-200c) in the wireless network (1000), according to the embodiments as disclosed herein. In an embodiment, the electronic device (100) includes a processor (110), a communicator (120), a memory (130) and a disoriented cell prioritization controller (140). The processor (110) is coupled with the communicator (120), the memory (130) and the disoriented cell prioritization controller (140).

The disoriented cell prioritization controller (140) receives the information about the plurality of disoriented cells (200a-200c). Further, the disoriented cell prioritization controller (140) determines the morphology factor of each disoriented cell of the plurality of disoriented cells (200a-200c). Further, the disoriented cell prioritization controller (140) determines the cell type of each disoriented cell of the plurality of disoriented cells (200a-200c) based on the morphology factor of each disoriented cell of the plurality of disoriented cells (200a-200c).

Further, the disoriented cell prioritization controller (140) determines the PRB utilization of each disoriented cell of the plurality of disoriented cells (200a-200c). In an embodiment, the disoriented cell prioritization controller (140) determines the average PRB utilization on hourly basis and the maximum average PRB utilization on hourly basis. Based on the average PRB utilization on hourly basis and the maximum average PRB utilization on hourly basis, the disoriented cell prioritization controller (140) determines the PRB utilization of each disoriented cell of disoriented cells.

Further, the disoriented cell prioritization controller (140) determines the number of RRC connected users of each disoriented cell of the plurality of disoriented cells (200a-200c). In an embodiment, the disoriented cell prioritization controller (140) determines the average RRC connected users on the hourly basis and the maximum RRC connected users on the hourly basis. Based on the average RRC connected users on hourly basis and the maximum RRC connected users on hourly basis, the disoriented cell prioritization controller (140) determines the number of RRC connected users of each disoriented cell of disoriented cells.

Further, the disoriented cell prioritization controller (140) determines the priority for each disoriented cell of the plurality of disoriented cells (200a-200c) based on the morphology factor, the cell type, the PRB utilization, and the RRC connected users. In an embodiment, the disoriented cell prioritization controller (140) retrieves the weightage for the cell type for each disoriented cell of the plurality of disoriented cells (200a-200c) from a cell type database (not shown) and retrieves the weightage for the morphology factor for each disoriented cell of the plurality of disoriented cells (200a-200c) from a morphology database (not shown). The morphology database and the cell type database are associated with the memory (130). For each disoriented cell of the plurality of disoriented cells (200a-200c), the disoriented cell prioritization controller (140) determines the priority by combining the weightage for the cell type, the weightage for the morphology factor, the PRB utilization, and the number of RRC connected users.

Further, the disoriented cell prioritization controller (140) prioritizes the plurality of disoriented cells (200a-200c) for optimization based on the priority for each disoriented cell of the plurality of disoriented cells (200a-200c). In an embodiment, the disoriented cell prioritization controller (140) sorts the priority of the plurality of disoriented cells (200a-200c) in the descending order or the ascending order. Further, the disoriented cell prioritization controller (140) ranks the plurality of disoriented cells (200a-200c) based on the sorted priority of the plurality of disoriented cells (200a-200c).

The disoriented cell prioritization controller (140) prioritizes the disoriented cells (e.g., network coverage loopholes or network gaps) so that a user (e.g., radio frequency (RF) engineer or operator) of the electronic device (100) gets to know the exact severity of the disoriented cells to optimize the disoriented cells for providing better service to the customer. The disoriented cell prioritization controller (140) can be used to assist the user to decide which disoriented cells should be mitigate first based on the identified priority in order to improve the network performance in an important geographical area. The disoriented cell prioritization controller (140) can be used to avoid coverage gaps or service gaps in the wireless network (1000).

The disoriented cell prioritization controller (140) is implemented by analog and/or digital circuits such as logic gates, integrated circuits, the processor (110), microprocessors, microcontrollers, memory circuits, passive electronic components, active electronic components, optical components, hardwired circuits and the like, and may optionally be driven by firmware.

Further, the processor (110) is configured to execute instructions stored in the memory (130) and to perform various processes. The communicator (120) is configured for communicating internally between internal hardware components and with external devices via one or more networks. The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

Although the FIG. 2 shows various hardware components of the electronic device (100) but it is to be understood that other embodiments are not limited thereon. In other embodiments, the electronic device (100) may include less or more number of components. Further, the labels or names of the components are used only for illustrative purpose and does not limit the scope of the invention. One or more components can be combined together to perform same or substantially similar function in the electronic device (100).

Figure 3A:
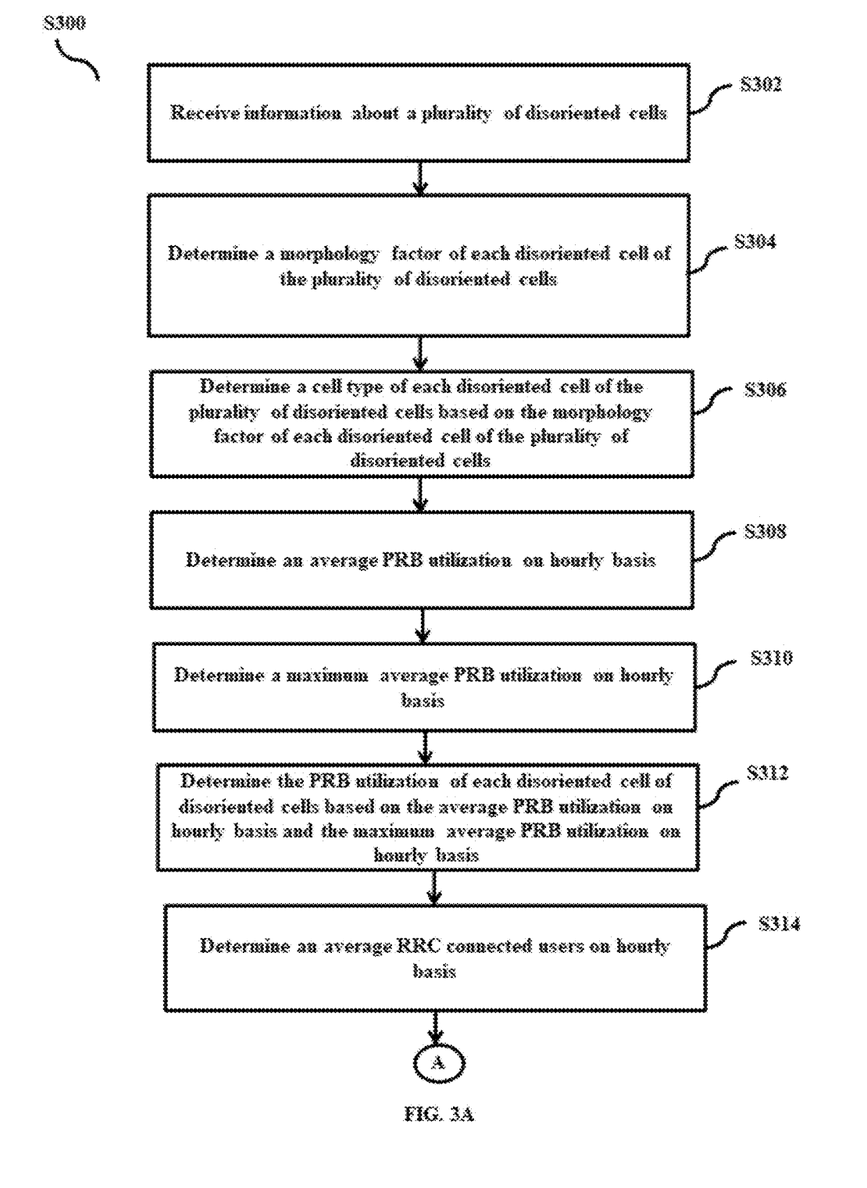
FIG. 3A and FIG. 3B are flow charts illustrating a method for prioritizing disoriented cells in the wireless network, according to the embodiments as disclosed herein.
Figure 3B:
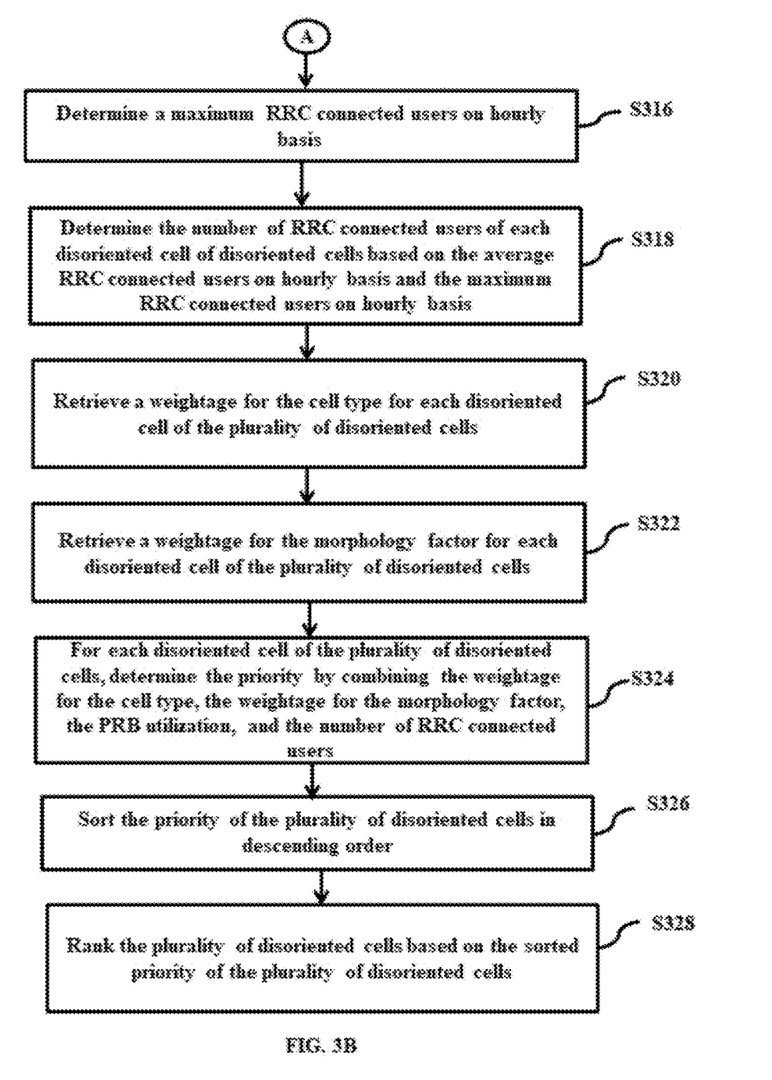

FIG. 3A and FIG. 3B are flow charts (S300) illustrating a method for prioritizing the disoriented cells in the wireless network (1000), according to the embodiments as disclosed herein. The operations (S302-S328) are handled by the disoriented cell prioritization controller (140).

At S302, the method includes receiving the information about the plurality of disoriented cells (200a-200c). At S304, the method includes determining the morphology factor of each disoriented cell of the plurality of disoriented cells (200a-200c). At S306, the method includes determining the cell type of each disoriented cell of the plurality of disoriented cells (200a-200c) based on the morphology factor of each disoriented cell of the plurality of disoriented cells (200a-200c).

At S308, the method includes determining the average PRB utilization on hourly basis. At S310, the method includes determining the maximum average PRB utilization on hourly basis. At S312, the method includes determining the PRB utilization of each disoriented cell of disoriented cells based on the average PRB utilization on hourly basis and the maximum average PRB utilization on hourly basis.

At S314, the method includes determining the average RRC connected users on hourly basis. At S316, the method includes determining the maximum RRC connected users on hourly basis. At S318, the method includes determining the number of RRC connected users of each disoriented cell of disoriented cells based on the average RRC connected users on hourly basis and the maximum RRC connected users on hourly basis.

At S320, the method includes retrieving the weightage for the cell type for each disoriented cell of the plurality of disoriented cells (200a-200c). At S322, the method includes retrieving the weightage for the morphology factor for each disoriented cell of the plurality of disoriented cells (200a-200c). At S324, the method includes determining the priority for each disoriented cell of the plurality of disoriented cells (200a-200c) by combining the weightage for the cell type, the weightage for the morphology factor, the PRB utilization, and the number of RRC connected users At S326, the method includes sorting the priority of the plurality of disoriented cells (200a-200c) in descending order. At S328, the method includes ranking the plurality of disoriented cells (200a-200c) based on the sorted priority of the plurality of disoriented cells (200a-200c).

Figure 4A:
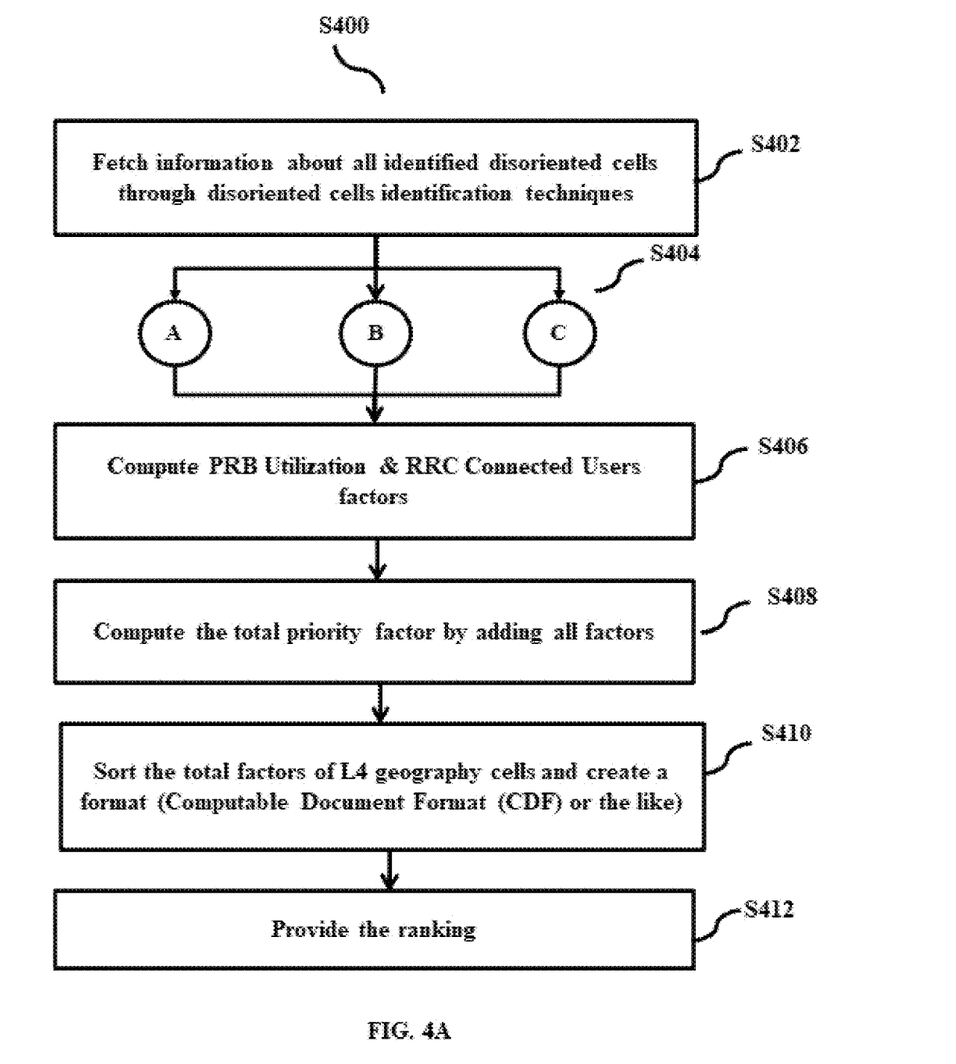
FIG. 4A to FIG. 4C are example flow charts illustrating a method for prioritizing disoriented cells in the wireless network, according to the embodiments as disclosed herein.
Figure 4B:
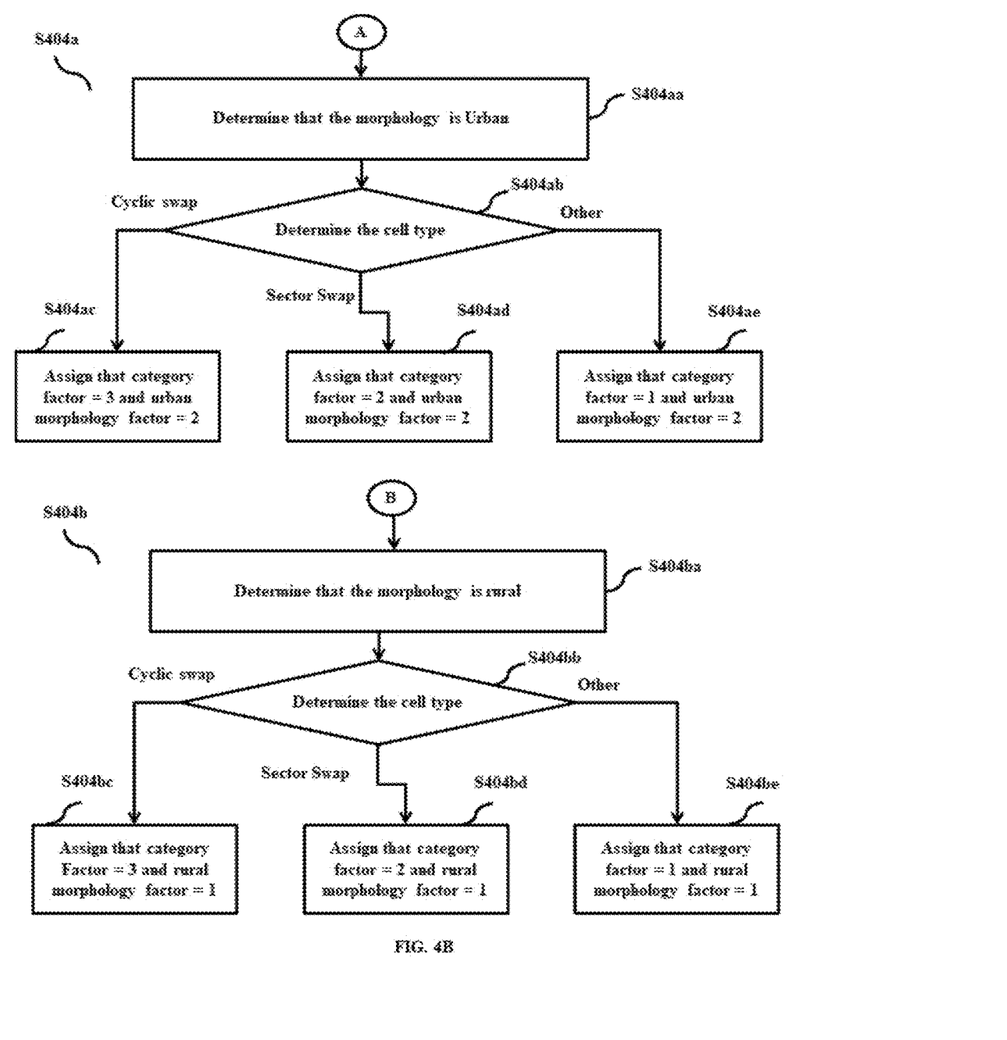
Figure 4C:
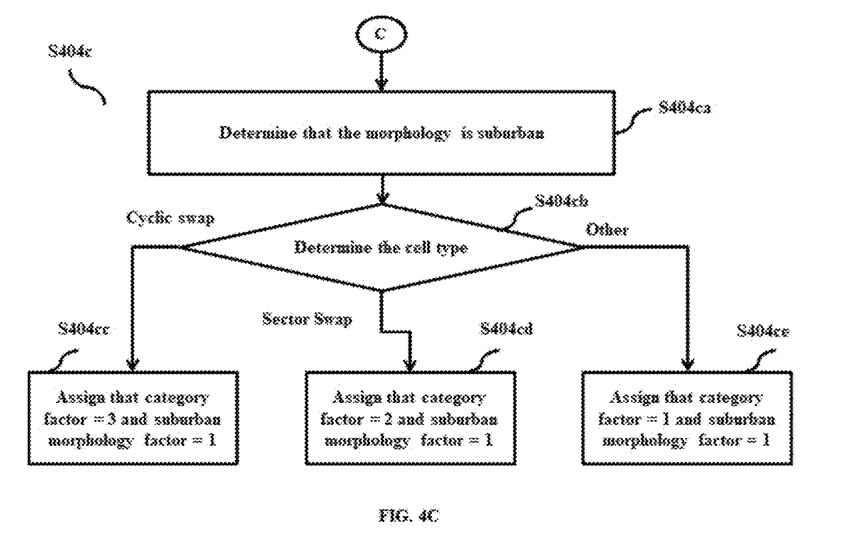

FIG. 4A to FIG. 4C are example flow charts (S400) illustrating a method for prioritizing the disoriented cells in the wireless network (1000), according to the embodiments as disclosed herein. The operations (S402-S412) are handled by the disoriented cell prioritization controller (140).

At S402, the method includes fetching information about the all identified disoriented cells through disoriented cells identification techniques. At S404aa, the method includes determining that the morphology is urban. At S404ab, the method includes determining the cell type (e.g., cyclic swap, the sector swap or other type of cell). Upon determining that the cell type is the cyclic swap, at S404ac, the method includes assigning the category factor is 3 and the urban morphology factor is 2. Upon determining that the cell type is the sector swap, at S404ad, the method includes assigning that the category factor=2 and the urban morphology factor is 2. Upon determining that the cell type is other type of cell, at S404ae, the method includes assigning that category factor is 1 and the urban morphology factor is 2.

At S404ba, the method includes determining that the morphology is rural. At S404bb, the method includes determining the cell type (e.g., cyclic swap, the sector swap or other type of cell). Upon determining that the cell type is the cyclic swap, at S404bc, the method includes assigning the category factor is 3 and the rural morphology factor is 1. Upon determining that the cell type is the sector swap, at S404bd, the method includes assigning that the category factor=2 and the rural morphology factor is 1. Upon determining that the cell type is other type of cell, at S404be, the method includes assigning that category factor is 1 and the rural morphology factor is 1.

At S404ca, the method includes determining that the morphology is suburban. At S404cb, the method includes determining the cell type (e.g., cyclic swap, the sector swap or other type of cell). Upon determining that the cell type is the cyclic swap, at S404cc, the method includes assigning the category factor is 3 and the suburban morphology factor is 1. Upon determining that the cell type is the sector swap, at S404cd, the method includes assigning that the category factor=2 and the suburban morphology factor is 1. Upon determining that the cell type is other type of cell, at S404ce, the method includes assigning that category factor is 1 and the suburban morphology factor is 1.

At S406, the method includes computing the PRB utilization and RRC connected user's factors. At S408, the method includes computing the total priority factor by adding all factors (discussed above). At S410, the method includes sorting the total factors of L4 geography cells and creating a format (e.g., Computable Document Format (CDF) format or the like). At S412, the method includes providing the ranking for the plurality of disoriented cells (200a-200c) based on the sorting.

The proposed method can be used to prioritize the disoriented cells (e.g., network coverage loopholes or network gaps) so that a user (e.g., radio frequency (RF) engineer or operator) of the electronic device (100) gets to know the exact severity of the disoriented cells to optimize the disoriented cells for providing better service to the customer. The method can be used to assist the user to decide which disoriented Cells should be mitigate first based on the identified priority in order to improve the network performance in an important geographical area.

The various actions, acts, blocks, steps, or the like in the flow charts (S300 and 400) may be performed in the order presented, in a different order or simultaneously. Further, in some embodiments, some of the actions, acts, blocks, steps, or the like may be omitted, added, modified, skipped, or the like without departing from the scope of the invention.

Figure 5:
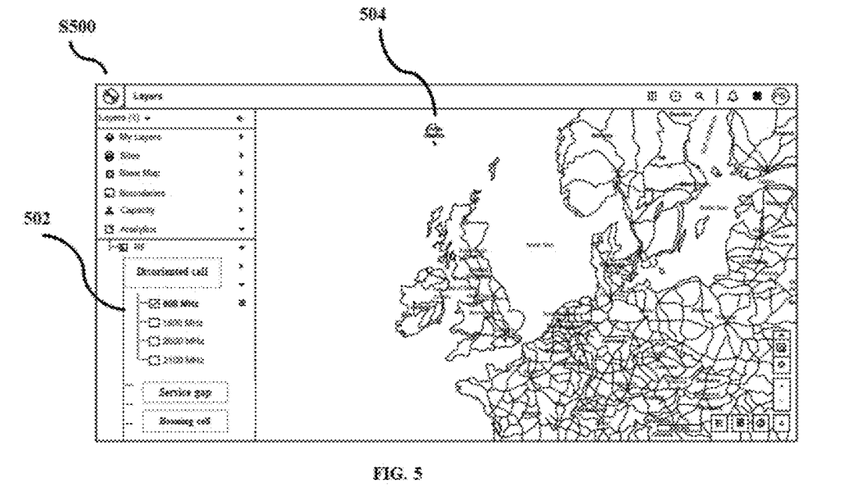
FIG. 5 is an example illustration in which a user interface of the electronic device displays bandwidth related information and a geography related information to prioritize the disoriented cells in the wireless network, according to the embodiments as disclosed herein.

FIG. 5 is an example illustration (S500) in which a user interface (502) of the electronic device (100) displays bandwidth related information and a geography related information (504) to prioritize the disoriented cells in the wireless network (1000), according to the embodiments as disclosed herein. The analytics related data (e.g., sites, base map, coverage holes, overshooting cells or the like) is provided in a left side of the user interface (502).

Figure 6:
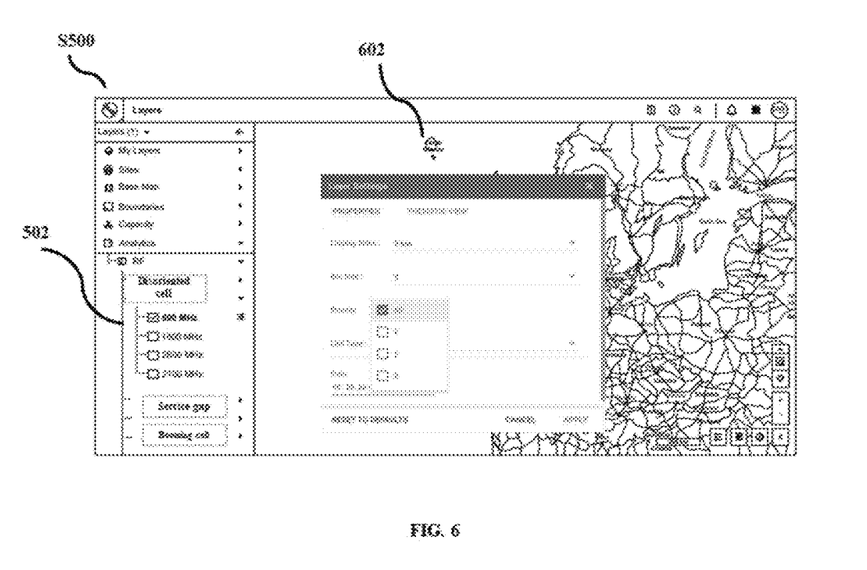
FIG. 6 and FIG. 7 are example illustrations in which a user interface of the electronic device displays bandwidth related information and layer setting to prioritize the disoriented cells in the wireless network, according to the embodiments as disclosed herein.
Figure 7:
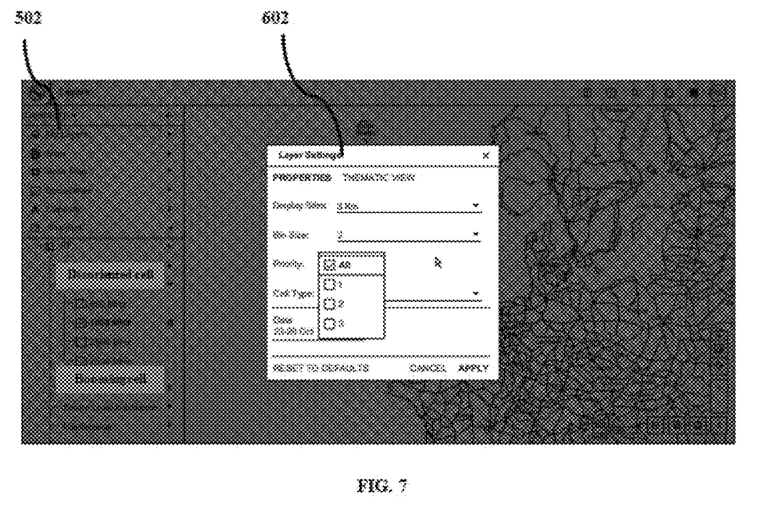

FIG. 6 and FIG. 7 are example illustrations (600) in which the user interface of the electronic device (100) displays bandwidth related information and layer setting (602) to prioritize the disoriented cells in the wireless network (1000), according to the embodiments as disclosed herein.

Figure 8:
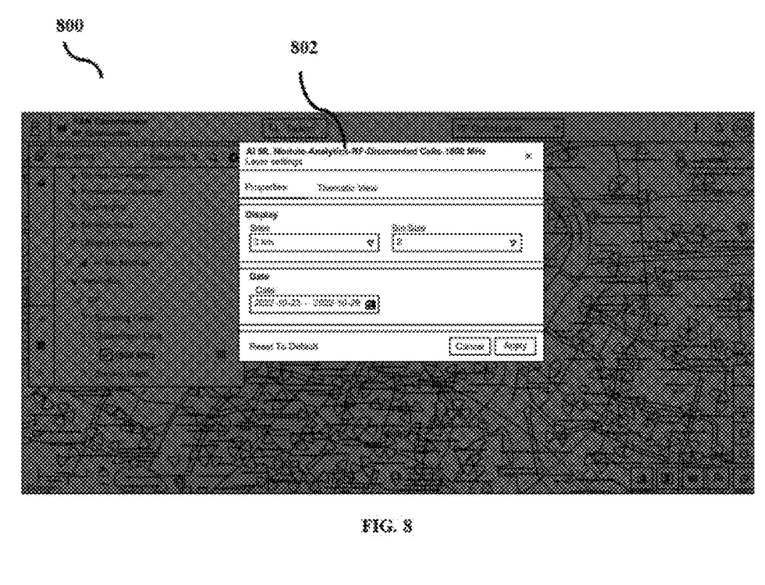
FIG. 8 is an example illustration in which a user interface of the electronic device prioritizes the disoriented cells at 1800 MHZ, according to the embodiments as disclosed herein.

FIG. 8 is an example illustration (800) in which a user interface (802) of the electronic device (100) prioritizes the disoriented cells at 1800 MHZ, according to the embodiments as disclosed herein.

Figure 9:
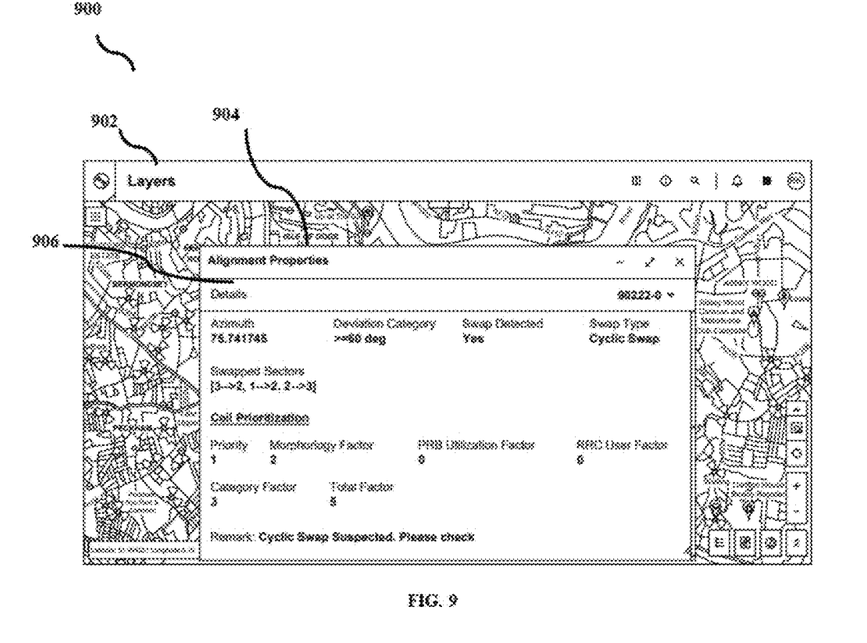
FIG. 9 is an example illustration in which a user interface of the electronic device prioritizes the disoriented cells in the wireless network, according to the embodiments as disclosed herein.

FIG. 9 is an example illustration in which a user interface (902) of the electronic device (100) prioritizes the disoriented cells in the wireless network (1000), according to the embodiments as disclosed herein. The user interface (902) displays map information and a sub-user interface (504). Various details (e.g., priority, morphology factor, PRB utilization factor, RRC user factor, category factor and total factor or the like) are provided to prioritize the disoriented cells in the wireless network (1000).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

We claim:

1. An electronic device for prioritizing disoriented cells in a wireless network, wherein the electronic device comprises:
    a memory; and
    a processor, communicatively coupled to the memory, configured to:
    receive information about a plurality of disoriented cells;
    determine a morphology factor of each disoriented cell of the plurality of disoriented cells, the morphology factor being based on a geographic classification, from among a plurality of predetermined geographic classifications, of each disoriented cell;
    determine a cell type of each disoriented cell of the plurality of disoriented cells based on the morphology factor of each disoriented cell of the plurality of disoriented cells;
    determine a Physical Resource Block (PRB) utilization of each disoriented cell of the plurality of disoriented cells;
    determine a number of Radio Resource Control (RRC) connected users of each disoriented cell of the plurality of disoriented cells;
    determine a priority for optimizing each disoriented cell of the plurality of disoriented cells based on the morphology factor, the cell type, the PRB utilization, and the RRC connected users; and
    output, to a user, a prioritization of the plurality of disoriented cells for optimization by the user based on the priority for each disoriented cell of the plurality of disoriented cells.

2. The electronic device as claimed in claim 1, wherein to determine the PRB utilization of each disoriented cell of the plurality of disoriented cells, the processor is configured to:
    determine an average PRB utilization on hourly basis;
    determine a maximum average PRB utilization on hourly basis; and
    determine the PRB utilization of each disoriented cell of disoriented cells based on the average PRB utilization on hourly basis and the maximum average PRB utilization on hourly basis.

3. The electronic device as claimed in claim 1, wherein to determine the number of RRC connected users of each disoriented cell of the plurality of disoriented cells, the processor is configured to:
    determine an average RRC connected users on hourly basis;
    determine a maximum RRC connected users on hourly basis; and
    determine the number of RRC connected users of each disoriented cell of disoriented cells based on the average RRC connected users on hourly basis and the maximum RRC connected users on hourly basis.

4. The electronic device as claimed in claim 1, wherein to determine the priority for each disoriented cell of the plurality of disoriented cells, the processor is configured to:
    retrieve a weightage for the cell type for each disoriented cell of the plurality of disoriented cells;
    retrieve a weightage for the morphology factor for each disoriented cell of the plurality of disoriented cells; and
    for each disoriented cell of the plurality of disoriented cells, determine the priority by combining the weightage for the cell type, the weightage for the morphology factor, the PRB utilization, and the number of RRC connected users.

5. The electronic device as claimed in claim 1, wherein to output the prioritization of the plurality of disoriented cells based on the priority for each disoriented cell of the plurality of disoriented cells, the processor is configured to:
    sort the priority of the plurality of disoriented cells in descending order; and
    rank the plurality of disoriented cells based on the sorted priority of the plurality of disoriented cells.

6. A method for prioritizing disoriented cells in a wireless network, wherein the method comprises:
    receiving, by an electronic device in the wireless network, information about a plurality of disoriented cells;

determining, by the electronic device, a morphology factor of each disoriented cell of the plurality of disoriented cells, the morphology factor being based on a geographic classification, from among a plurality of predetermined geographic classifications, of each disoriented cell;

determining, by the electronic device, a cell type of each disoriented cell of the plurality of disoriented cells based on the morphology factor of each disoriented cell of the plurality of disoriented cells;

determining, by the electronic device, a Physical Resource Block (PRB) utilization of each disoriented cell of the plurality of disoriented cells;

determining, by the electronic device, a number of Radio Resource Control (RRC) connected users of each disoriented cell of the plurality of disoriented cells;

determining, by the electronic device, a priority for optimizing each disoriented cell of the plurality of disoriented cells based on the morphology factor, the cell type, the PRB utilization, and the RRC connected users; and outputting, by the electronic device, a prioritization of the plurality of disoriented cells for optimization based on the priority for each disoriented cell of the plurality of disoriented cells.

7. The method as claimed in claim 6, wherein determining, by the electronic device, the PRB utilization of each disoriented cell of the plurality of disoriented cells comprises:

determining, by the electronic device, an average PRB utilization on hourly basis;

determining, by the electronic device, a maximum average PRB utilization on hourly basis; and determining, by the electronic device, the PRB utilization of each disoriented cell of disoriented cells based on the average PRB utilization on hourly basis and the maximum average PRB utilization on hourly basis.

8. The method as claimed in claim 6, wherein determining, by the electronic device, the number of RRC connected users of each disoriented cell of the plurality of disoriented cells comprises:

determining, by the electronic device, an average RRC connected users on hourly basis;

determining, by the electronic device, a maximum RRC connected users on hourly basis; and determining, by the electronic device, the number of RRC connected users of each disoriented cell of disoriented cells based on the average RRC connected users on hourly basis and the maximum RRC connected users on hourly basis.

9. The method as claimed in claim 6, wherein determining, by the electronic device, the priority for each disoriented cell of the plurality of disoriented cells comprises:

retrieving, by the electronic device, a weightage for the cell type for each disoriented cell of the plurality of disoriented cells from a cell type database;

retrieving, by the electronic device, a weightage for the morphology factor for each disoriented cell of the plurality of disoriented cells from a morphology database; and for each disoriented cell of the plurality of disoriented cells, determining, by the electronic device, the priority by combining the weightage for the cell type, the weightage for the morphology factor, the PRB utilization, and the number of RRC connected users.

10. The method as claimed in claim 6, wherein outputting, by the electronic device, the prioritization of the plurality of disoriented cells based on the priority for each disoriented cell of the plurality of disoriented cells comprises:

sorting, by the electronic device, the priority of the plurality of disoriented cells in descending order; and ranking, by the electronic device, the plurality of disoriented cells based on the sorted priority of the plurality of disoriented cells.

* * * * *